United States Patent
Sajassi et al.

(10) Patent No.: US 10,057,386 B1
(45) Date of Patent: Aug. 21, 2018

(54) SUMMARIZING AND FLOOD SUPPRESSING MESSAGES

(71) Applicant: Cisco Technology, Inc., San Jose, CA (US)

(72) Inventors: Ali Sajassi, San Ramon, CA (US); Samir Thoria, Saratoga, CA (US); Ravindra Nandalal Rathi, Fremont, CA (US); Keyur Patel, San Jose, CA (US); Derek Man-Kit Yeung, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 5 days.

(21) Appl. No.: 15/223,151

(22) Filed: Jul. 29, 2016

(51) Int. Cl.
| H04L 12/28 | (2006.01) |
| H04L 12/56 | (2006.01) |
| H04L 29/06 | (2006.01) |
| H04L 12/723 | (2013.01) |
| H04L 12/18 | (2006.01) |
| H04L 12/46 | (2006.01) |

(52) U.S. Cl.
CPC ............ H04L 69/08 (2013.01); H04L 12/185 (2013.01); H04L 12/4633 (2013.01); H04L 45/50 (2013.01)

(58) Field of Classification Search
CPC ... H04L 69/08; H04L 12/4633; H04L 12/185; H04L 45/50
USPC .......................................................... 370/390
See application file for complete search history.

(56) References Cited

U.S. PATENT DOCUMENTS

| 9,306,758 | B2* | 4/2016 | Kollipara | ................ H04L 45/16 |
| 2011/0188499 | A1* | 8/2011 | Wijnands | ................ H04L 12/56 370/390 |
| 2014/0241351 | A1* | 8/2014 | Kollipara | ................ H04L 45/16 370/390 |
| 2014/0241352 | A1* | 8/2014 | Kollipara | ................ H04L 45/16 370/390 |
| 2016/0337423 | A1* | 11/2016 | Uchida | ............... H04L 12/4633 |

* cited by examiner

*Primary Examiner* — Chuong T Ho
(74) *Attorney, Agent, or Firm* — Merchant & Gould P.C.

(57) ABSTRACT

Message summarization and flood suppression may be provided. A proxy (e.g., an IGMP Proxy) process may be used to reduce the flooding of messages (e.g., IGMP messages) over a network (e.g., an EVPN network). A triggering process may also be provided for provider edge (PE) devices to setup their underlay multicast tunnels. The proxy may comprise two components: i) a proxy for reports (e.g., IGMP reports); and ii) a proxy for queries (e.g., IGMP Queries).

19 Claims, 5 Drawing Sheets

SUMMARIZING AND FLOOD SUPPRESSING MESSAGES

TECHNICAL FIELD

The present technology relates to network based services, and more specifically, to message summarization and flood suppression.

BACKGROUND

Multi-Protocol Label Switching (MPLS) is a type of data-carrying technique for high-performance telecommunications networks that directs data from one network node to the next based on short path labels rather than long network addresses, avoiding complex lookups in a routing table. The labels identify virtual links (paths) between distant nodes rather than endpoints. MPLS can encapsulate packets of various network protocols, hence its name "multiprotocol". MPLS supports a range of access technologies, including T1/E1, ATM, Frame Relay, and DSL.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Message summarization and flood suppression may be provided. A proxy (e.g., an IGMP Proxy) process may be used to reduce the flooding of messages (e.g., IGMP messages) over a network (e.g., an EVPN network). A triggering process may also be provided for provider edge (PE) devices to setup their underlay multicast tunnels. The proxy may comprise two components: i) a proxy for reports (e.g., IGMP reports); and ii) a proxy for queries (e.g., IGMP Queries).

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A computer network can include a system of hardware, software, protocols, and transmission components that collectively allow separate devices to communicate, share data, and access resources, such as software applications. More specifically, a computer network may be a geographically distributed collection of nodes interconnected by communication links and segments for transporting data between endpoints, such as personal computers and workstations. Many types of networks may be available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs may connect nodes over dedicated private communications links located in the same general physical location, such as a building or campus. WANs, on the other hand, may connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet may be an example of a public WAN that connects disparate networks throughout the world, providing global communication between nodes on various networks. The nodes may communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (APs), which can extend the size or footprint of the network.

A service provider network can provide service to customer networks via Provider Edge (PE) devices (e.g., routers or switches) that may be located at the edge of the service provider network. Each PE device may be connected directly to a Customer Edge (CE) device (e.g., host, router, source, or switch) located at the edge of a customer network. In other cases, an Access Network (AN) may provide connectivity (via Ethernet Virtual Circuits (EVC)) in order to interconnect PE and CE devices. In some instances, the AN can be an Ethernet Access Network (EAN) that can support EVCs by utilizing 802.1Q encapsulations. In other embodiments, the AN may be an IP or an MPLS network that may support EVCs by utilizing Ethernet over IP encapsulation or Ethernet over MPLS encapsulation, respectively. The PE devices in a service provider network may be connected by a Multi-Protocol Label Switching (MPLS) infrastructure that provides benefits such as fast-reroute and resiliency. The PE devices may also be connected by an IP infrastructure that utilizes Generic Routing Encapsulation (GRE) tunneling or other IP tunneling between the PE devices.

An Ethernet Virtual Private Network (EVPN) may be a layer 2 virtual private network (VPN) technology built over a Packet Switched Network (PSN) (e.g., utilizing an MPLS/IP infrastructure). An EVPN instance may include CE devices that may be connected to PE devices that may form the edge of the MPLS infrastructure. An EVPN instance can include one or more broadcast domains (e.g., one or more VLANs) that may be assigned to a given EVPN instance by the provider of the EVPN service. The PE devices provide virtual layer 2 bridged connectivity between the CE devices. A service provider network can include multiple EVPN instances. EVPN may provide advanced multi-homing capabilities and may use Border Gateway Protocol (BGP) to distribute customer MAC address information over the core MPLS network.

Ethernet Provider Backbone Bridging (PBB) can be combined with EVPN to create a PBB-EVPN. In PBB-EVPN, MAC-in-MAC tunneling may be employed to improve service instance and MAC address scalability in Ethernet networks. PBB-EVPN may reduce the number of BGP MAC advertisement routes by aggregating Customer/Client MAC (C-MAC) address via Provider Backbone MAC address (B-MAC).

EVPN and PBB-EVPN can each provide a service provider network with solutions for multipoint Ethernet services utilizing MPLS/IP networks and advanced multi-homing capabilities. For example, EVPN and PBB-EVPN may each support single-homed devices, single-homed networks, multi-homed devices and multi-homed networks. A customer multi-homed device or a customer multi-homed network may tolerate certain network failures because the connection to two or more PE devices may provide additional redundancy. In all-active redundancy mode, all of the PE devices attached to a customer multi-homed device/network may be allowed to forward traffic to/from that customer device or customer network. In single-active redundancy mode, only a single PE device (the designated forwarder), among a group of PE devices attached to a customer multi-homed device/network, may be allowed to forward traffic to/from the customer device or customer network. In the event a failure occurs at the PE device that is the designated forwarder, a new designated forwarder can be elected in order to maintain network connectivity.

In the case where a CE device/network may be multi-homed to two or more PE devices, the set of Ethernet links between the CE device and the PE devices may constitute an Ethernet Segment (ES). In instances when an AN is used, a port (physical or logical (e.g., bundle)) on a PE device acts as a Network-to-Network Interface (NNI). In this context, NNIs may be used to aggregate and interconnect customers to a PE device by utilizing access Ethernet Virtual Circuits (EVCs). An External NNI (ENNI) may be used when the AN is built and operated by a third-party Service Provider. An Ethernet Segment that consists of EVCs instead of physical links may be referred to as a Virtual Ethernet Segment (vES).

The use of virtual Ethernet Segments may expand the capability of a single PE device. In the case of an ES, the PE device may be limited to having a single CE device connected to each of its ports (i.e., there is a one-to-one relationship between a CE device and a physical/logical port (e.g., a bundle such as a 2×10 GE bundle) on the PE. In the case of a vES, the PE device can be configured to provide service to thousands of customers over a common NNI that terminates access EVCs interconnecting thousands of CE devices).

Figure 1:
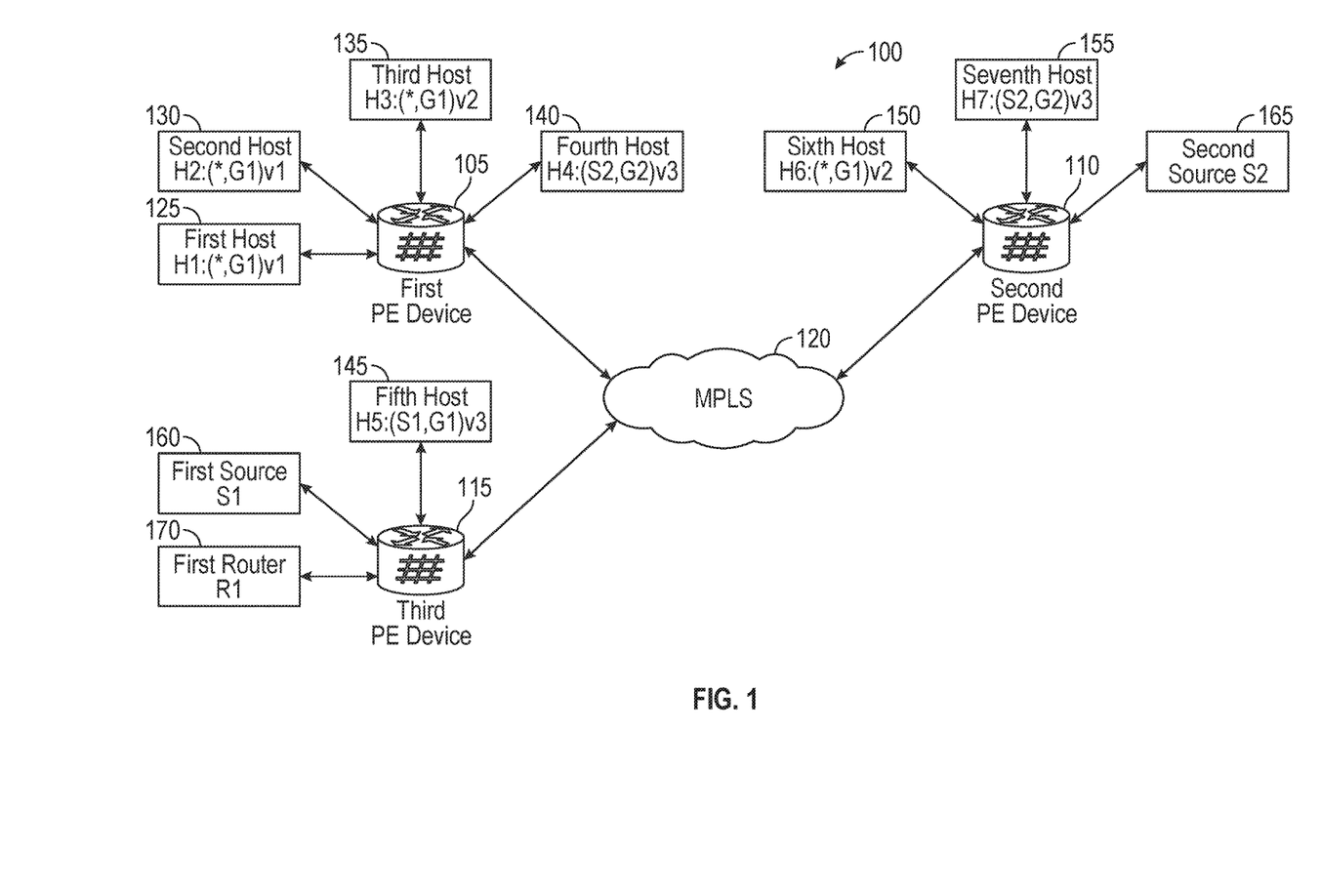
FIG. 1 is a block diagram of a service provider system.

FIG. 1 is a block diagram of a service provider system 100 including nodes/devices interconnected by various processes for communication. As shown in FIG. 1, service provider system 100 may comprise a plurality of provider edge (PE) devices (e.g., a first PE device 105, a second PE device 110, a third PE device 115). First PE device 105, second PE device 110, and third PE device 115 may be connected to and may communicate over a network 120. Network 120 may comprise, but is not limited to, a Multi-Protocol Label Switching (MPLS) network.

In addition, service provider system 100 may include a plurality of host devices (e.g., a first host device 125, a second host device 130, and third host device 135, a fourth host device 140, a fifth host device 145, a sixth host device 150, and a seventh host device 155). Service provider system 100 may further comprise a plurality of multicast source devices (e.g., a first source device 160 and a second source device 165). Service provider system 100 may also include a first multicast router 170. The plurality of PE devices may comprise an edge of network 120 that may face the plurality of host devices, the plurality of source devices, and first router 170.

As shown in FIG. 1, first host device 125, second host device 130, third host device 135, and fourth host device 140 may be connected to first PE device 105. Sixth host device 150, seventh host device 155, and second source device 165 may be connected to second PE device 110. And fifth host device 145, first source device 160, and first router 170 may be connected to third PE device 115.

First host device 125, second host device 130, third host device 135, fifth host device 145, and sixth host device 150 may all be interested in the same group (e.g., same multicast group), for example group 1 (G1). Similarly, fourth host device 140 and seventh host device 155 may be associated in the same group (e.g., same multicast group), for example group 2 (G2). First host device 125 and second host device 130 may be capable of communicating over system 100 using a first version (v1) of a first protocol. Third host device 135 and sixth host device 150 may be capable of communicating over system 100 using a second version (v2) of the first protocol. And fourth host device 140, fifth host device 145, and seventh host device 155 may be capable of communicating over system 100 using a third version (v3) of the first protocol. First PE device 105, second PE device 110, and third PE device 115 may communicate over a network 120 via a second protocol. The first protocol may comprise, but is not limited to, Internet Group Management Protocol (IGMP). The second protocol may comprise, but is not limited to, Border Gateway Protocol (BGP).

Embodiments of the disclosure may be used in data centers (DC). In DC applications, a POD may comprise a collection of servers supported by several Top-of-Rack (ToR) and Spine routers. This collection of servers and routers may be self-contained and may have their own control protocol for intra-POD communication and orchestration. However, EVPN may be used as a way of standard inter-POD communication for both intra-DC and inter-DC. A subnet may span across multiple PODs and DCs. There may be many hosts/virtual machines (VMs) (e.g., several hundreds) attached to a subnet that may be stretched across several PODs and DCs. These hosts/VMs may express their interests in multicast groups on a given subnet/VLAN by sending IGMP membership reports (e.g., joins) for their interested multicast group(s). Furthermore, an IGMP router (e.g., IGMPv1) may periodically send membership queries to find out if there are hosts on that subnet still interested in receiving multicast traffic for that group. This may result in: i) many IGMP reports for the same multicast group and version to be flooded in the network over and over again; and ii) many query messages to be flooded in the network periodically.

Embodiments of the disclosure may prevent such flooding in an EVPN network. For example, embodiments of the disclosure may reduce the flood of IGMP messages (e.g., both queries and reports) in EVPN. In addition, embodiments of the disclosure may summarize multiple IGMP reports (for different versions) into a single message. A distributed anycast multicast router may also be provided by embodiments of the disclosure, for example, when there is no physical/virtual multicast router attached to the EVPN network for a given (*,G) or (S,G) on a given subnet.

The above objectives may be achieved by providing enhanced IGMP proxy services in EVPN PE device where received IGMP reports may be terminated by the first hop router (PE device) and then summarized before getting propagated in BGP to other PE devices that are interested in the information. The information is again translated back to IGMP message at the recipient EVPN speaker. Thus, it helps create an IGMP overlay subnet using BGP. In order to facilitate such an overlay, embodiments of the disclosure may provide a new EVPN route type NLRI (EVPN Selective Multicast Ethernet Tag route) along with its procedures to help exchange and register IGMP multicast groups.

Furthermore, each EVPN PE device with embodiments of the disclosure may provide enhanced proxy query functionality in order to: i) enable the collection of EVPN PE devices providing L2VPN service to act as a distributed multicast router with Anycast IP address for all attached hosts/VMs in that subnet; ii) enable suppression of IGMP membership reports and queries over an MPLS/IP core; and iii) enable generation of query messages locally to their attached host.

Proxy Reporting: Embodiments of the disclosure may provide proxy reporting. When a first protocol (e.g., IGMP protocol) is used between host/VMs (e.g., the plurality of hosts) and its first hop EVPN router (e.g., plurality of PE devices), proxy-reporting may be used by the plurality of PE devices to summarize reports received from downstream hosts and propagate it in a second protocol (e.g., BGP) to other PE devices that are interested in the information. This may be done by terminating the reports (e.g., IGMP reports) in the first hop PE, translating, and exchanging the relevant information between EVPN speakers (e.g., BGP speakers). The information is again translated back to the first protocol (e.g., IGMP) at the recipient EVPN speaker. Accordingly, embodiments of the disclosure may create an IGMP overlay subnet using BGP.

Membership Report Advertisement: Embodiments of the disclosure may provide first protocol (e.g., IGMP) membership report (i.e. join message) advertisement in the second protocol (e.g. BGP.) Consistent with embodiments of the disclosure, when one of the plurality of PE devices wants to advertise a membership report (i.e., a "join" message) using, for example, the second protocol (e.g., BGP) EVPN route, embodiments of the disclosure may use the following rules. While IGMP and BGP may be used as the first protocol and the second protocol, respectively, in the following rules, they are examples and other protocols may be used.

Rule 1: When the first hop PE receives several IGMP membership reports (Joins), belonging to the same IGMP version, from different attached hosts/VMs (e.g., the plurality of hosts) for the same (*,G) or (S,G), it may only sends a single BGP message corresponding to the very first IGMP Join. This is because BGP may be a statefull protocol and no further transmission of the same report may be needed. If the IGMP Join is for (*,G), then multicast group address along with the corresponding version flag (v1, v2, or v3) may be set. In the case of IGMPv3, an exclude flag may also need to be set to indicate that no source IP address to be excluded (e.g., include all sources "*"). If the IGMP Join is for (S,G), then besides setting multicast group address along with the version flag v3, the source IP address and the include/exclude flag may be set. When advertising the EVPN route for (S,G), for example, the only valid version flag may be v3 (i.e., v1 and v2 flags may be set to zero).

Rule 2: When the first hop PE device receives an IGMPv3 Join for (S,G), then the PE device may check to see if the source (S) is attached to self. If so, it may not send the corresponding BGP EVPN route advertisement.

Rule 3: When the first hop PE receives an IGMP version-X Join first for (*,G) and then later it receives an IGMP version-Y Join for the same (*,G), then it may re-advertise the same EVPN Selective Multicast route with flag for version-Y set in addition to any previously-set version flag(s). In other words, the first hop PE device may not withdraw the EVPN route before sending the new route because the flag field may not be part of BGP route key processing.

Rule 4: When the first hop PE device receives an IGMP version-X Join first for (*,G) and then later it receives an IGMPv3 Join for the same multicast group address but for a specific source address S, then the PE device may advertise a new EVPN Selective Multicast route with v3 flag set (and v1 and v2 reset). Include/exclude flag also may need to be set accordingly. Since source IP address may be used as part of BGP route key processing, it may be considered as a new BGP route advertisement.

Rule 5: When a PE device receives an EVPN Selective Multicast route with more than one version flag set, it may generate the corresponding IGMP report for (*,G) for each version specified in the flag field. With multiple version flags set, there may be no source IP address in the receive EVPN route. If there is, then an error may be logged. If v3 flag is set (in addition to v1 or v2), then the include/exclude flag may need to indicate "exclude". If not, then an error may be logged. The PE device may generate an IGMP membership report (Join) for that (*,G) and each IGMP version in the version flag.

Rule 6: When a PE device receives a list of EVPN Selective Multicast NLRIs in its BGP update message, each with a different source IP address and the multicast group address, and the version flag is set to v3, then the PE device may generate an IGMPv3 membership report with a record corresponding to the list of source IP addresses and the group address along with the proper indication of inclusion/exclusion.

Rule 7: Upon receiving EVPN Selective Multicast route(s) and before generating the corresponding IGMP Join(s), the PE device may check to see whether it has any multicast router's AC(s) (Attachment Circuits connected to multicast routers). If it has router's ACs, then the generated IGMP Join(s) may be sent to those ACs. If it does not have any router's AC, then no IGMP Join(s) may need to be generated because sending IGMP Joins to other hosts may result in unintentionally preventing a host from joining a specific multicast group for IGMPv1 and IGMPv2 (i.e., if the PE device does not receive a join from the host, it may not forward multicast data to it. When an IGMPv1 or IGMPv2 host receives a membership report for a group address that it intends to join, the host may suppress its own membership report for the same group. This message suppression may be a requirement for IGMPv1 and IGMPv2 hosts. This may not be a problem for hosts running IGMPv3 because there may be no suppression of IGMP Membership reports.

Leave Group Advertisement: Embodiments of the disclosure may provide first protocol (e.g., IGMP) leave group (i.e., leave message) advertisement in the second protocol (e.g., BGP). Consistent with embodiments of the disclosure, when a PE device wants to withdraw an EVPN Selective Multicast route corresponding to an IGMPv2 Leave Group (Leave) or IGMPv3 "Leave" equivalent message, it follows the following rules. While IGMP and BGP may be used as the first protocol and the second protocol, respectively, in the follow rules, they are examples and other protocols may be used.

Rule 1: For IGMPv1, there may be no explicit membership leave; therefore, the PE device may need to periodically send out an IGMP membership query to determine whether there is any host left who is interested in receiving traffic directed to this multicast group. This proxy query function is described in more detail below.

Rule 2: When a PE device receives an IGMPv2 Leave Group or its "Leave" equivalent message for IGMPv3 from its attached host, it may check to see if this host is the last host who is interested in this multicast group by sending a query for the multicast group. If the host was indeed the last one, then the PE device may re-advertise EVPN Selective Multicast route with the corresponding version flag reset. If this is the last version flag to be reset, then instead of re-advertising the EVPN route with all version flags reset, the PE device may withdraw the EVPN route for that (*,G).

Rule 3: When a PE device receives an EVPN Selective Multicast route for a given (*,G), it may compare the received version flags from the route with its per-PER stored version flags. If the PE device finds that a version flag associated with the (*,G) for the remote PE device is reset, then the PE device may generate IGMP Leave for that (*,G) toward its local interface (if any) attached to the multicast router for that multicast group. It may also remove the remote PE device from the OIF list associated with that multicast group. The received EVPN route, for example, may at least have one version flag set. If all version flags are reset, it may be an error because the PE device should have received an EVPN route withdraw for the last version flag.

Rule 4: If the reset version flag is for version-1 (v1) or if the EVPN route withdraw is for version-1 (v1), the PE device may remove the remote PE device from its OIF list for that multicast group. If there are no more OIF entries for that multicast group (either locally or remotely), then the PE device may stop responding to queries from the locally attached router (if any). If there is a source for that multicast group, the PE device may stop sending multicast traffic for that source.

Proxy Querier: Consistent with embodiments of the disclosure, each PE device may have proxy querier functionality. This functionality may enable the collection of EVPN PE devices providing L2VPN service to act as distributed multicast router with Anycast IP address for all attached hosts/VMs in that subnet. This functionality may also enable suppression of IGMP membership reports and queries over MPLS/IP core. Furthermore, this functionality may enable generation of query messages locally to their attached host. In the case of IGMPv1, the PE device may send out an IGMP membership query to verify that at least one host on the subnet is still interested in receiving traffic directed to that group. When there is no reply to three consecutive IGMP membership queries, for example, the PE device may time out the group, stops forwarding multicast traffic to the attached hosts for that (*,G), and send a EVPN Selective Multicast route associated with that (*,G) with the version-1 flag reset or withdraws that route.

Consider system 100 as shown in FIG. 1, where there may be an EVPN instance configured across the plurality of PE devices (i.e., first PE device 105, second PE device 110, and third PE device 115). This EVPN instance may comprise a single bridge domain (single subnet) with all the plurality of hosts, the plurality of sources, and first router 170 connected to this subnet. As shown in FIG. 1, first PE device 105 may only have hosts connected to it. Second PE device 110 may have a mix of hosts and multicast source. And third PE device 115 may have a mix of hosts, multicast source, and multicast router. Furthermore, for (S1,G1), first router 170 may be used as the multicast router, but for (S2, G2), a distributed multicast router with Anycast IP address may be used. The following describes the first protocol (e.g., IGMP) proxy operation in different ones of the plurality of PE devices with regard to whether the locally attached devices for that subnet are: i) only hosts/VMs; ii) mix of hosts/VMs and multicast source; or iii) mix of hosts/VMs, multicast source, and multicast router.

Figure 2:
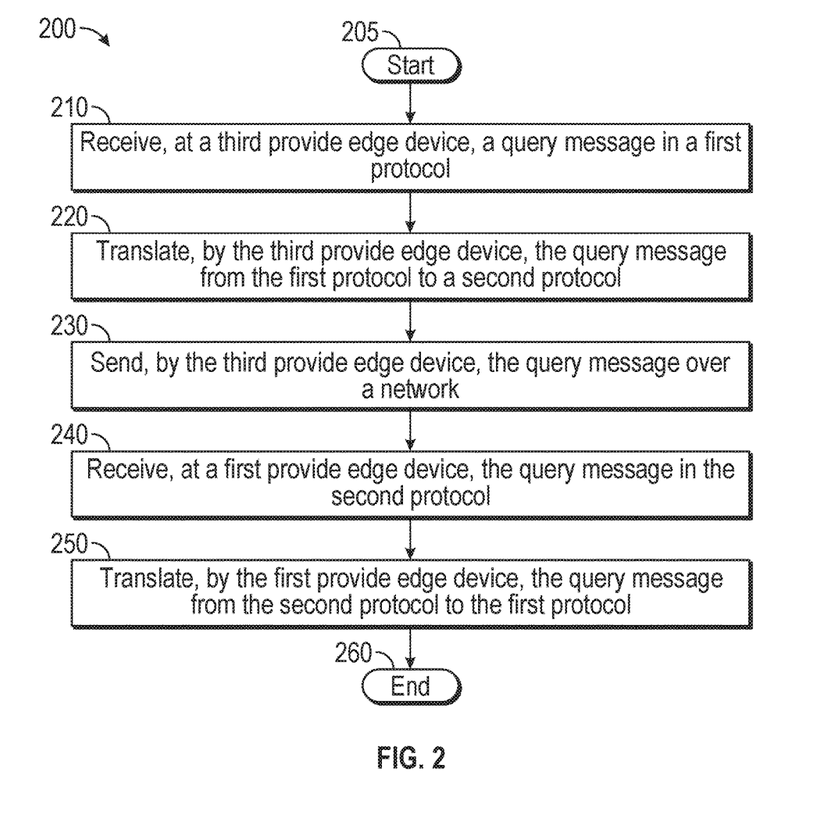
FIG. 2 is a flow chart of a method for providing message flood suppression.

FIG. 2 is a flow chart setting forth the general stages involved in a method 200 consistent with an embodiment of the disclosure for providing message flood suppression. Method 200 may be implemented using service provider system 100 as described in more detail above with respect to FIG. 1. Ways to implement the stages of method 200 will be described in greater detail below.

Method 200 may begin at starting block 205 and proceed to stage 210 where third PE device 115 may receive a query message in a first protocol. For example, first router 170 may send the query message in the first protocol (e.g., IGMP) to third PE device 115. This query message may be directed to all group 1 (G1) hosts in system 100. The sending of this same query message may be repeated periodically from first router 170 to third PE device 115. Consistent with embodiments of the disclosure, each of the plurality of PE devices in system 100 may have this proxy querier functionality. This functionality may enable the plurality of PE devices providing L2VPN service to act as a distributed multicast router with Anycast IP address for all of the plurality of host devices in system 100.

From stage 210, where third PE device 115 receives the query message in the first protocol, method 200 may advance to stage 220 where third PE device 115 may translate the query message from the first protocol to a second protocol. For example, third PE device 115 may translate the query message from IGMP to BGP. When the aforementioned subsequent periodically repeated queries sent from first router 170 are received, third PE device 115 may not translate them, but rather suppress them.

Once third PE device 115 translates the query message from the first protocol to the second protocol in stage 220, method 200 may continue to stage 230 where third PE device 115 may send the query message over network 120. Because third PE device 115 translated and sent only one query and suppressed subsequent periodic repeats of this query, traffic on network 120 is lessened compared to if a message were sent for every query and its subsequent period repeat.

After third PE device 115 sends the query message over network 120 in stage 230, method 200 may proceed to stage 240 where first PE device 105 may receive the query message in the second protocol. For example, first PE device 105 may receive the query message because it may have several group 1 (G1) host devices attached to it (e.g., first host device 125, second host device 130, and third host device 135).

From stage 240, where first PE device 105 receives the query message in the second protocol, method 200 may advance to stage 250 where first PE device 105 may translate the query message from the second protocol to the first protocol. For example, first PE device 105 may translate the query message from BGP back into IGMP and then send it along to the group 1 (G1) host devices attached to it (e.g., first host device 125, second host device 130, and third host device 135). First PE device 105 may subsequently and periodically repeat this sending of the message to the group 1 (G1) host devices attached to it (e.g., first host device 125, second host device 130, and third host device 135). Accordingly, the periodic sending of the query message from first router 170 and the period receipt of this query message by first host device 125, second host device 130, and third host device 135 may be accomplished when the query message is sent only once over network 120. Accordingly, the suppression of flooding network 120 may be accomplished. Once first PE device 105 translates the query message from the second protocol to the first protocol in stage 250, method 200 may then end at stage 260.

Figure 3:
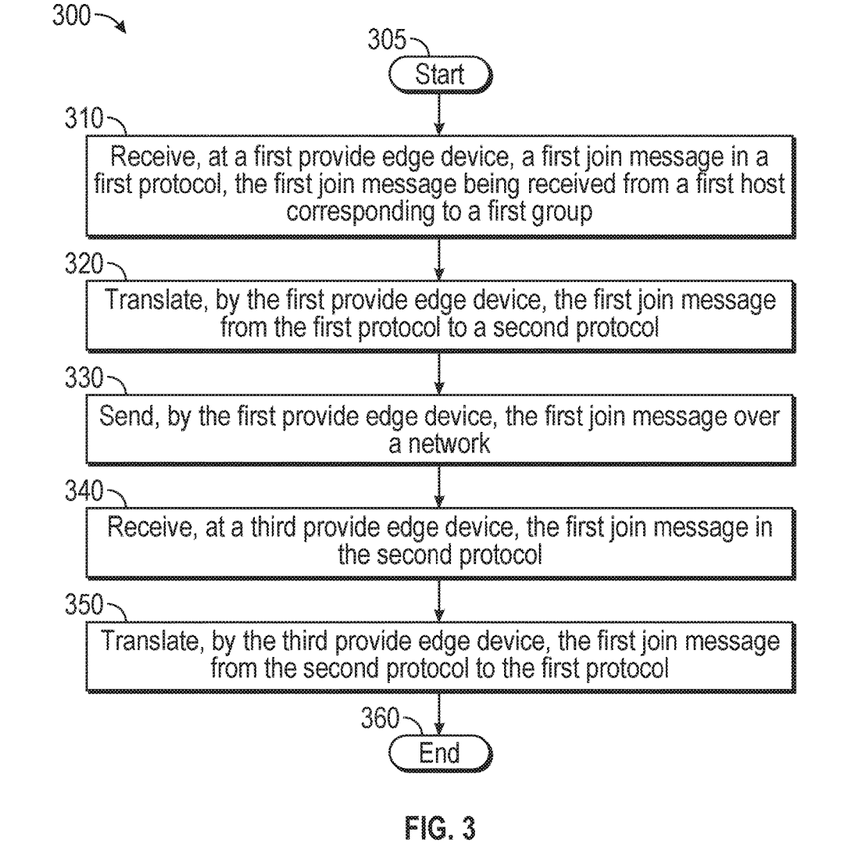
FIG. 3 is a flow chart of a method for summarizing reports.

FIG. 3 is a flow chart setting forth the general stages involved in a method 300 consistent with an embodiment of the disclosure for summarizing reports. Method 300 may be implemented using service provider system 100 as described in more detail above with respect to FIG. 1. Ways to implement the stages of method 300 will be described in greater detail below.

Method 300 may begin at starting block 305 and proceed to stage 310 where first PE device 105 may receive a first join message in a first protocol. The first join message may be received from first host 125 corresponding to a first group (e.g., G1). The first protocol may comprise, but is not limited to, IGMP. For example, when first PE device 105 receives the first join message (e.g., an IGMPv1 join Report) from first host 125, it may not forward this join to any of its other ports (for this subnet) because all these local ports may be associated with the hosts/VMs (i.e., second host 130, third host 135, and fourth host 140).

From stage 310, where first PE device 105 receives the first join message in the first protocol, method 300 may advance to stage 320 where first PE device 105 may translate the first join message from the first protocol to a second protocol. The second protocol may comprise, but is not limited to, BGP. For example, first PE device 105 may use the first join message from the first protocol to create, in BGP, an EVPN Multicast Group route corresponding to this join for (*,G1) and may set v1 flag.

Once first PE device 105 translates the first join message from the first protocol to the second protocol in stage 320, method 300 may continue to stage 330 where first PE device 105 may send the first join message over network 120. For example, first PE device 105 may send the created EVPN Multicast Group route.

After first PE device 105 sends the first join message over network 120 in stage 330, method 300 may proceed to stage 340 where third PE device 115 may receive the first join message in the second protocol. For example, this EVPN route may be received by second PE device 110 and third PE device 115 that may be the member of the same EVI.

From stage 340, where third PE device 115 receives the first join message in the second protocol, method 300 may advance to stage 350 where third PE device 115 may translate the first join message from the second protocol to the first protocol. For example, third PE device 115 may reconstruct the IGMPv1 Join Report from this EVPN (BGP) route and send it to the port(s) with multicast routers attached to it (for that subnet). In this example, third PE device 115 may send the reconstructed IGMPv1 Join Report for (*, G1) to only first router 170. Furthermore, although second PE device 110 may have received the EVPN BGP route, it may not send it to any of its port for that subnet (i.e., sixth host 150 and seventh host 155).

When first PE device 105 receives a second IGMPv1 Join from second host device 130 for the same multicast group (*, G1) (e.g., a second join message in the first protocol), it may only add that port to its OIF list, but it may not send (e.g., it suppresses) any EVPN BGP route because there is no change in information. However, when first PE device 105 receives the IGMPv2 Join from third host device 135 for the same (*, G1), besides adding the corresponding port to its OIF list, it re-advertises the previously sent EVPN Selective Multicast route with the version-2 (v2) flag set because third host device 135 may run version-2 (v2) of the first protocol rather than version-1 v1). When first PE device 105 receives the IGMPv3 Join from fourth host device 140 for (S2, G2), it may advertises a new EVPN Selective Multicast route corresponding to it, because it is associated with group 2 (G2) unlike the other hosts on first PE device 105, which may not be associated with group 1 (G1).

Second PE device 110 may be connected with a mix of attached hosts/VMs and multicast source. When second PE device 110 receives IGMPv3 Join from seventh host device 155 for (S2,G2), it may not advertise it in the second protocol (e.g., BGP) because second PE device 110 may know that second source device 165 may be attached to its local AC. Second PE device 110 may add the port associated with seventh host device 155 to its OIF list for (S2,G2). The processing for IGMPv2 received from sixth host device 150 may be the same as the v2 Join described above.

Third PE device 115 may be connected with a mix of attached hosts/VMs, multicast source, and router. In this instance, Join messages received locally by third PE device 115 may need to be sent to the port associated with first router 170. Furthermore, the Joins received via BGP may need to be passed to first router 170's port, but may be filtered for all other ports. Once third PE device 115 translates the first join message from the second protocol to the first protocol in stage 350, method 300 may then end at stage 360.

Embodiments of the disclosure may define a new BGP EVPN route to carry IGMP membership reports. This route type may be referred to as +6-Selective Multicast Ethernet Tag Route. The encoding and procedures for this route type may be described below. While it is described in terms of IGMP (e.g., the first protocol) and BGP (e.g., the second protocol), this route type is not so limited and may use other protocols.

Selective Multicast Ethernet Tag Route: A Selective Multicast Ethernet Tag route type specific EVPN NLRI may be illustrated in Table 1.

TABLE 1

RD (8 octets)
Ethernet Tag ID (4 octets)
Multicast Source Length (1 octet)
Multicast Source Address (variable)
Multicast Group Length (1 octet)
Multicast Group Address (Variable)
Originator Router Length (1 octet)
Originator Router Address (variable)
Flags (1 octet) (optional)

For the purpose of BGP route key processing, all the fields may be considered to be part of the prefix in the NLRI except for the one octet optional flag field (if included). The Flags fields may be illustrated in Table 2.

TABLE 2

| 0 | 1 | 2 | 3 | 4 | 5 | 6 | 7 |
|---|---|---|---|---|---|---|---|
| Reserved | Reserved | Reserved | Reserved | IE | v3 | v2 | v1 |

The least significant bit, bit 7 may indicate support for IGMP version 1 (v1). The second least significant bit, bit 6 may indicate support for IGMP version 2 (v2). The third least significant bit, bit 5 may indicate support for IGMP version 3 (v3). The forth least significant bit, bit 4 may indicate whether the (S, G) information carried within the route-type is of Include Group type (bit value 0) or an Exclude Group type (bit value 1), for example. The Exclude Group type bit may be ignored if bit 5 is not set.

This EVPN route type may be used to carry tenant IGMP multicast group information. The flag field may assist in distributing IGMP membership interest of a given host/VM for a given multicast route. The version bits may help associate IGMP version of receivers participating within the EVPN domain. The include/exclude bit may help in creating filters for a given multicast route.

Constructing the Selective Multicast route: Below describes a process that may be used to construct the Selective Multicast Ethernet Tag Route. The Route Distinguisher (RD) may be a Type 1 RD. The value field may comprises an IP address of the PE (typically, the loopback address) followed by a number unique to the PE. The Ethernet Tag ID may be set to zero for VLAN-based service and to a valid normalized VID for VLAN-aware bundle service. The Multicast Source length may be set to the length of the multicast source address in bits. In case of a (*, G) Join, the Multicast Source Length may be set to 0.

The Multicast Source may be the Source IP address of the IGMP membership report. In the case of a (*, G) Join, this field may not exist. The Multicast Group length may be set to length of multicast group address in bits. The Multicast Group may be the Group address of the IGMP membership report. The Originator Router Length may be the length of the Originator Router address in bits. The Originator Router Address may be the IP address of Router Originating the prefix. The Flags field may indicate the version of IGMP protocol from which the membership report was received. It also may indicate whether the multicast group had INCLUDE or EXCLUDE bit set.

IGMP protocol may be used to receive group membership information from hosts/VMs by TORs. Upon receiving the hosts/VMs expression of interest of a particular group membership, this information may then be forwarded to BGP EVPN using Ethernet Multicast Source Group Route NLRI. The NLRI also may keep track of a receiver's IGMP protocol version and any "source filtering" for a given group membership. All Ethernet Multicast Source Group Routes may be announced with ES-Import Route Target extended communities.

Figure 4:
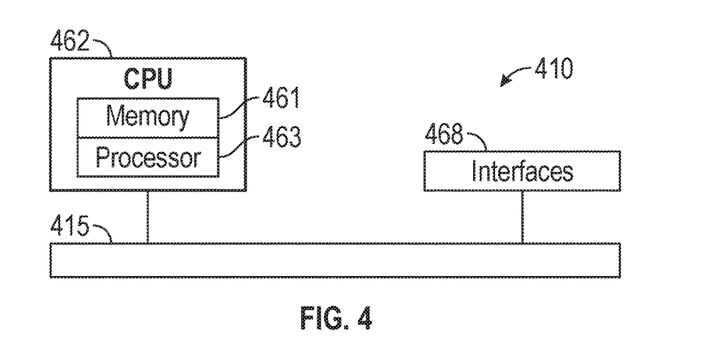
FIG. 4 is a block diagram of a network device.

FIG. 4 shows an example network device 410 that may comprise any one or more of the plurality of PE devices, the plurality of host devices, the plurality of source devices, or router 170. A network device 410 may include a master central processing unit (CPU) 462, interfaces 468, and a bus 415 (e.g., a PCI bus). When acting under the control of appropriate software or firmware, CPU 462 may be responsible for executing packet management, error detection, and/or routing or forwarding functions. CPU 462 may accomplish all these functions under the control of software including an operating system and any appropriate applications software. CPU 462 may include one or more processors 463 such as a processor from any family of microprocessors. Consistent with embodiments of the disclosure, processor 463 may have hardware for controlling the operations of network device 410. A memory 461 (e.g., such as non-volatile RAM and/or ROM) may also form part of CPU 462.

Interfaces 468 may be provided as interface cards (e.g., "line cards"). They may control the sending and receiving of data packets over the network and sometimes support other peripherals used with network device 410. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. These interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow master microprocessor 462 to efficiently perform routing computations, network diagnostics, security functions, etc.

Although the system shown in FIG. 4 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the router.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 5A:
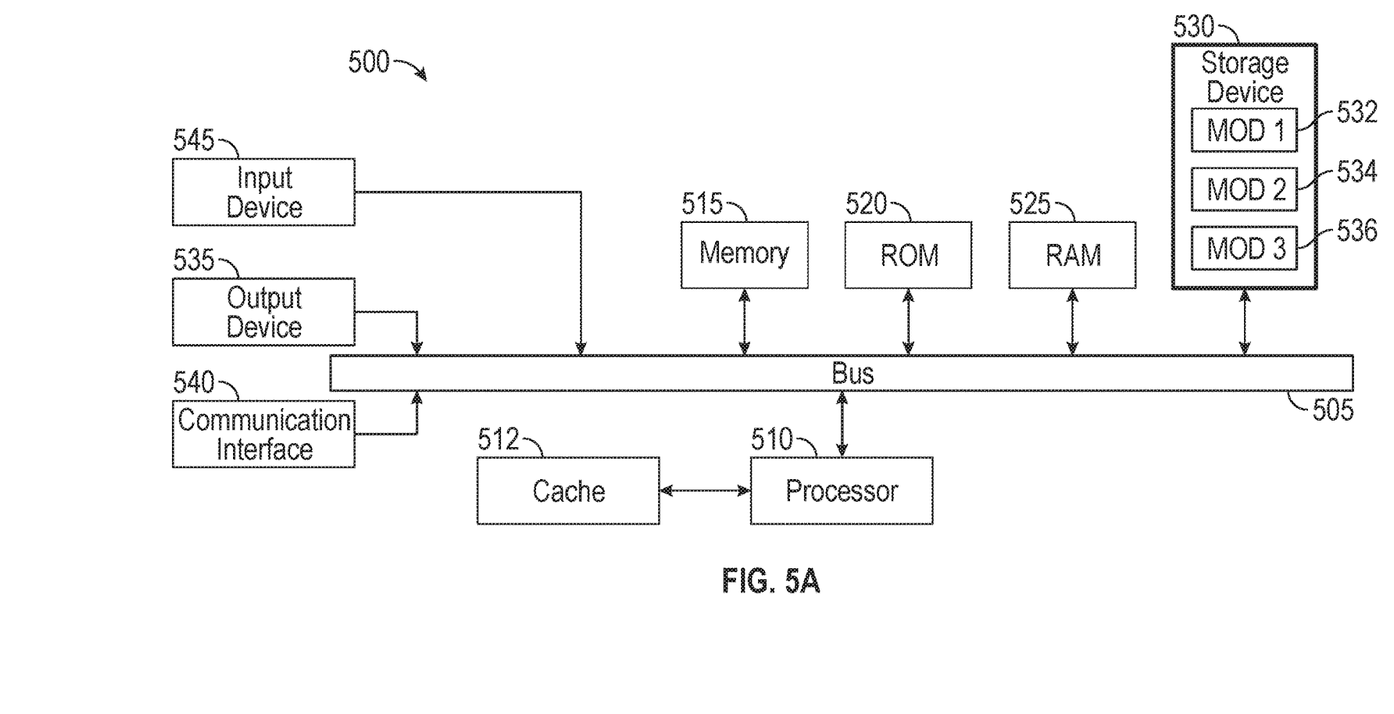
FIGS. 5A and 5B are block diagrams of a system.
Figure 5B:
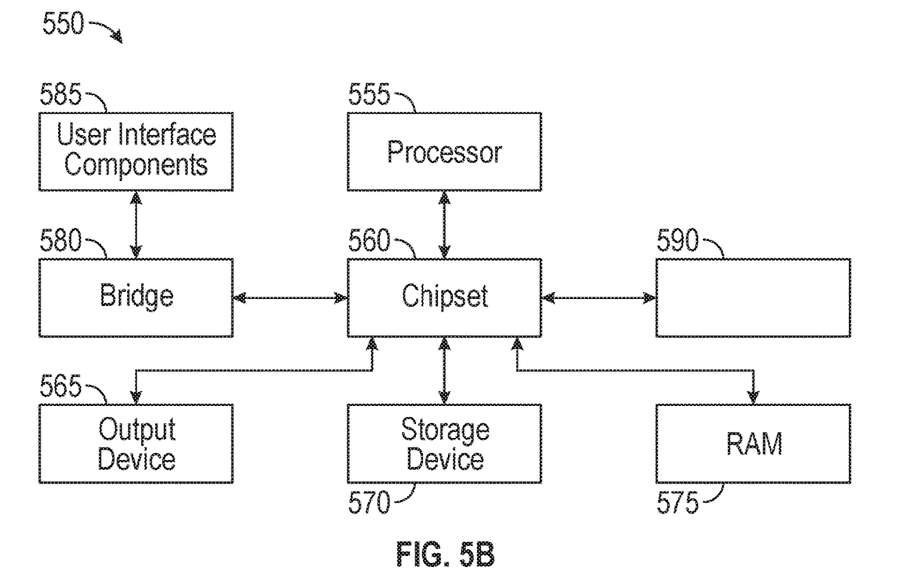

FIG. 5A and FIG. 5B illustrate example system embodiments. FIG. 5A shows a system bus computing system architecture 500 wherein the components of the system are in electrical communication with each other using a bus 505. System bus computing system architecture 500 may comprise any one or more of the plurality of PE devices, the plurality of host devices, the plurality of source devices, or router 170. System 500 may include a processing unit (CPU or processor) 510 and a system bus 505 that may couple various system components including system memory 515, such as a read only memory (ROM) 570 and a random access memory (RAM) 575, to processor 510. System 500 may include a cache of high-speed memory connected directly with, in close proximity to, or integrated as part of processor 510. System 500 may copy data from the memory 515 and/or storage device 530 to a cache 517 for access by processor 510. In this way, cache 517 may provide a performance boost that may avoid processor 510 delays while waiting for data. These and other modules may control or be configured to control processor 510 to perform various actions. Other system memory 515 may be available for use as well. Memory 515 may include multiple different types of memory with different performance characteristics. Processor 510 may include any general purpose processor and a hardware module or software module, such as a module 1 537, a module 7 534, and a module 3 536 stored in storage device 530, configured to control processor 510 as well as a special-purpose processor where software instructions are incorporated into the actual processor design. Processor 510 may be a completely self-contained computing system, containing multiple cores or processors, a bus, memory controller, cache, etc. A multi-core processor may be symmetric or asymmetric.

To enable user interaction with computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms. In some instances, multimodal systems may enable a user to provide multiple types of input to communicate with computing device 500. Communications interface 540 may generally govern and manage the user input and system output. There may be no restriction on operating on any particular hardware arrangement and therefore the basic features here may easily be substituted for improved hardware or firmware arrangements as they are developed.

Storage device 530 may be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 575, read only memory (ROM) 570, and hybrids thereof.

Storage device 530 may include software modules 537, 534, 536 for controlling the processor 510. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B shows an example computer system 550 that may comprise any one or more of the plurality of PE devices, the plurality of host devices, the plurality of source devices, or router 170. Computer system 550 may have a chipset architecture that may be used in executing the described method 200 or method 300 above. Computer system 550 may be an example of computer hardware, software, and firmware that can be used to implement the disclosed technology. System 550 may include a processor 555, representative of any number of physically and/or logically distinct resources capable of executing software, firmware, and hardware configured to perform identified computations. Processor 555 may communicate with a chipset 560 that may control input to and output from processor 555. In this example, chipset 560 may output information to output 565, such as a display, and may read and write information to storage device 570, which can include magnetic media, and solid state media, for example. Chipset 560 may also read data from and write data to RAM 575. A bridge 580 for interfacing with a variety of user interface components 585 may be provided for interfacing with chipset 560. Such user interface components 585 may include a keyboard, a microphone, touch detection and processing circuitry, a pointing device, such as a mouse, and so on. Inputs to system 550 may come from any of a variety of sources, machine generated and/or human generated.

Chipset 560 may also interface with one or more communication interfaces 590 that can have different physical interfaces. Such communication interfaces may include interfaces for wired and wireless local area networks, for broadband wireless networks, as well as personal area networks. Some processes for generating, displaying, and using the GUI may include receiving ordered datasets over a physical interface or may be generated by processor 555 analyzing data stored in storage 570 or 575. Further, the machine can receive inputs from a user via user interface components 585 and execute appropriate functions, such as browsing functions by interpreting these inputs using processor 555.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, at a first provide edge device, a first query message in a first protocol;
   translating, by the first provide edge device, the first query message from the first protocol to a second protocol;
   sending, by the first provide edge device, the first query message over a network;
   receiving, at a second provide edge device, the first query message in the second protocol;
   translating, by the second provide edge device, the first query message from the second protocol to the first protocol;
   receiving, at the first provide edge device, a second query message in the first protocol;
   determining, by the first provide edge device, that the second query message corresponds to the first query message; and
   suppressing, by the first provide edge device, the second query message in response to determining that the second query message corresponds to the first query message.

2. The method of claim 1, further comprising sending, periodically by the second provide edge device, the first query message in the first protocol.

3. The method of claim 1, further comprising sending, periodically by the second provide edge device, the first query message in the first protocol to a host connected to the second provide edge device.

4. The method of claim 3, wherein receiving the first query message comprises receiving the first query message from a router corresponding to the host.

5. The method of claim 1, wherein receiving the first query message in the first protocol comprises receiving the first query message in the first protocol comprising Internet Group Management Protocol (IGMP).

6. The method of claim 1, wherein translating the first query message from the first protocol to the second protocol comprises translating the first query message from the first protocol to the second protocol comprising Border Gateway Protocol (BGP).

7. The method of claim 1, wherein sending the first query message over the network comprises sending the first query message over the network comprising a Multiprotocol Label Switching (MPLS) network.

8. The method of claim 1, further comprising:
   generating, by the first provide edge device, a membership query message to one or more hosts attached to the first provide edge device; and
   stop forwarding, by the first provide edge device in response to receiving no reply for a predetermined number of membership query messages, traffic from a group associated with the membership query to the one or more hosts.

9. The method of claim 1, further comprising:
   receiving, the first provide edge device, a third message in a different version of the first protocol;
   reconfiguring, the first provide edge device, the first message to set a flag in a field corresponding to the different version; and
   resending, the first provide edge device, the reconfigured first message over the network.

10. A system comprising:
    a first provide edge device configured to:
      receive a first message in a first protocol,
      translate the first message from the first protocol to a second protocol, and
      send the first message over a network; and
    a second provide edge device configured to:
      receive the first message in the second protocol, and
      translate the first message from the second protocol to the first protocol,
    wherein the first provide edge device is further configured to:
      receive a second message in the first protocol,
      determine that the second message corresponds to the first message, and
      suppress the second message in response to determining that the second message corresponds to the first message.

11. The system of claim 10, wherein the first message comprises an Internet Group Management Protocol (IGMP) join message.

12. The system of claim 10, wherein the first message comprises an Internet Group Management Protocol (IGMP) query message.

13. The system of claim 10, wherein the first message comprises an Internet Group Management Protocol (IGMP) leave message.

14. The system of claim 10, wherein the second protocol comprises Border Gateway Protocol (BGP).

15. The system of claim 10, wherein the first provide edge device is further configured to:
- generate a membership query message to one or more hosts attached to the first provide edge device; and
- stop forwarding, in response to receiving no reply for a predetermined number of membership query messages, traffic from a group associated with the membership query to the one or more hosts.

16. The system of claim 10, wherein the second provide edge device is configured to send the translated first message to a plurality of host devices connected to the second provide edge device.

17. The system of claim 10, wherein the first message is received from a first host device attached to the first provide edge device at a first port, and wherein the second message is received from a second host device attached to the first provide edge device at a second port.

18. The system of claim 10, where in the first message and the second message each comprises a request to join a multicast group.

19. The system of claim 10, wherein the first provide edge device is further configured to:
- receive a third message in a different version of the first protocol;
- reconfigure the first message to set a flag in a field corresponding to the different version; and
- resend the reconfigured first message over the network.

\* \* \* \* \*